(No Model.) 4 Sheets—Sheet 2.
H. JERGER.
WATER ENGINE.
No. 477,256. Patented June 21, 1892.
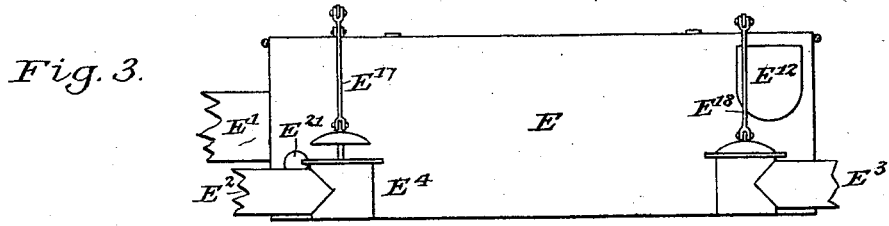
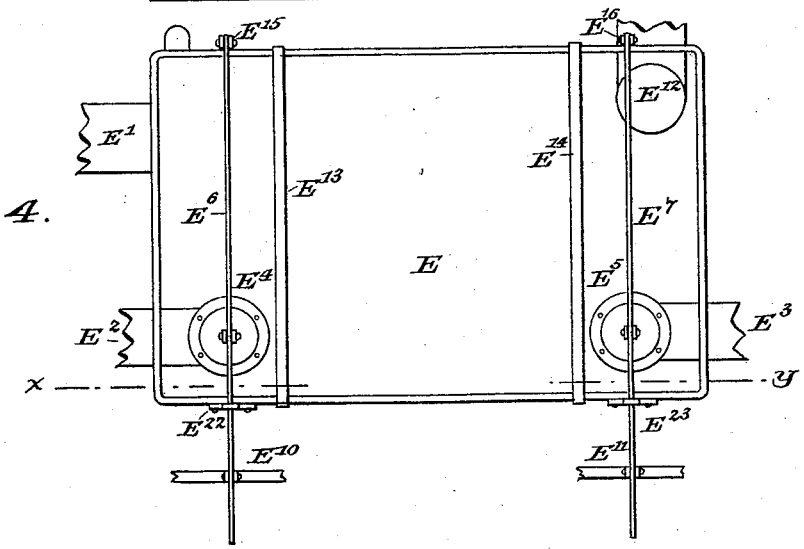
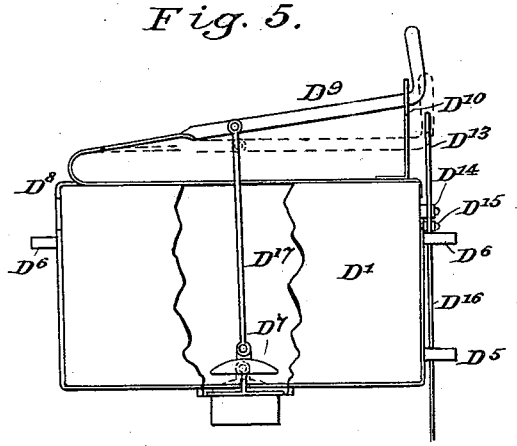
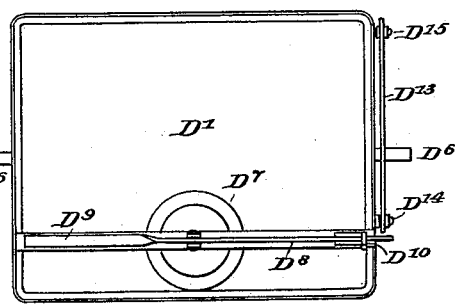
WITNESSES:
INVENTOR
Henry Jerger
BY Richards
ATTORNEYS

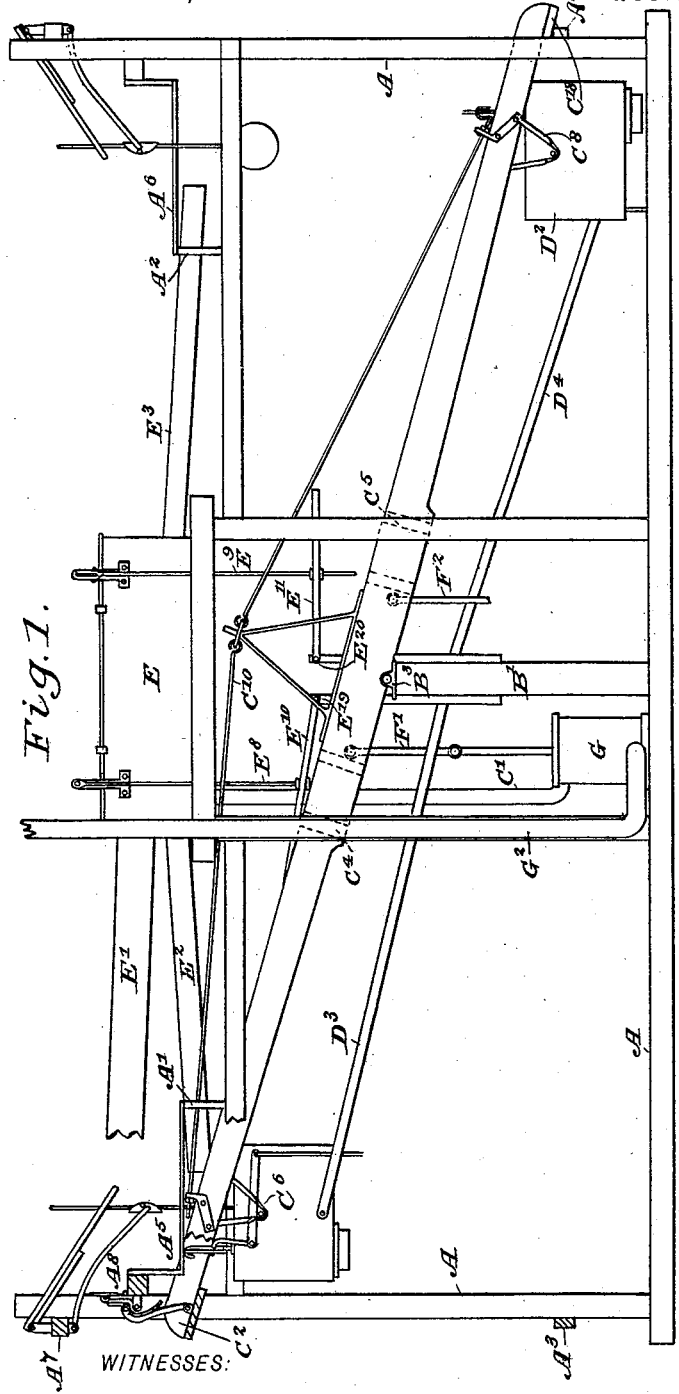

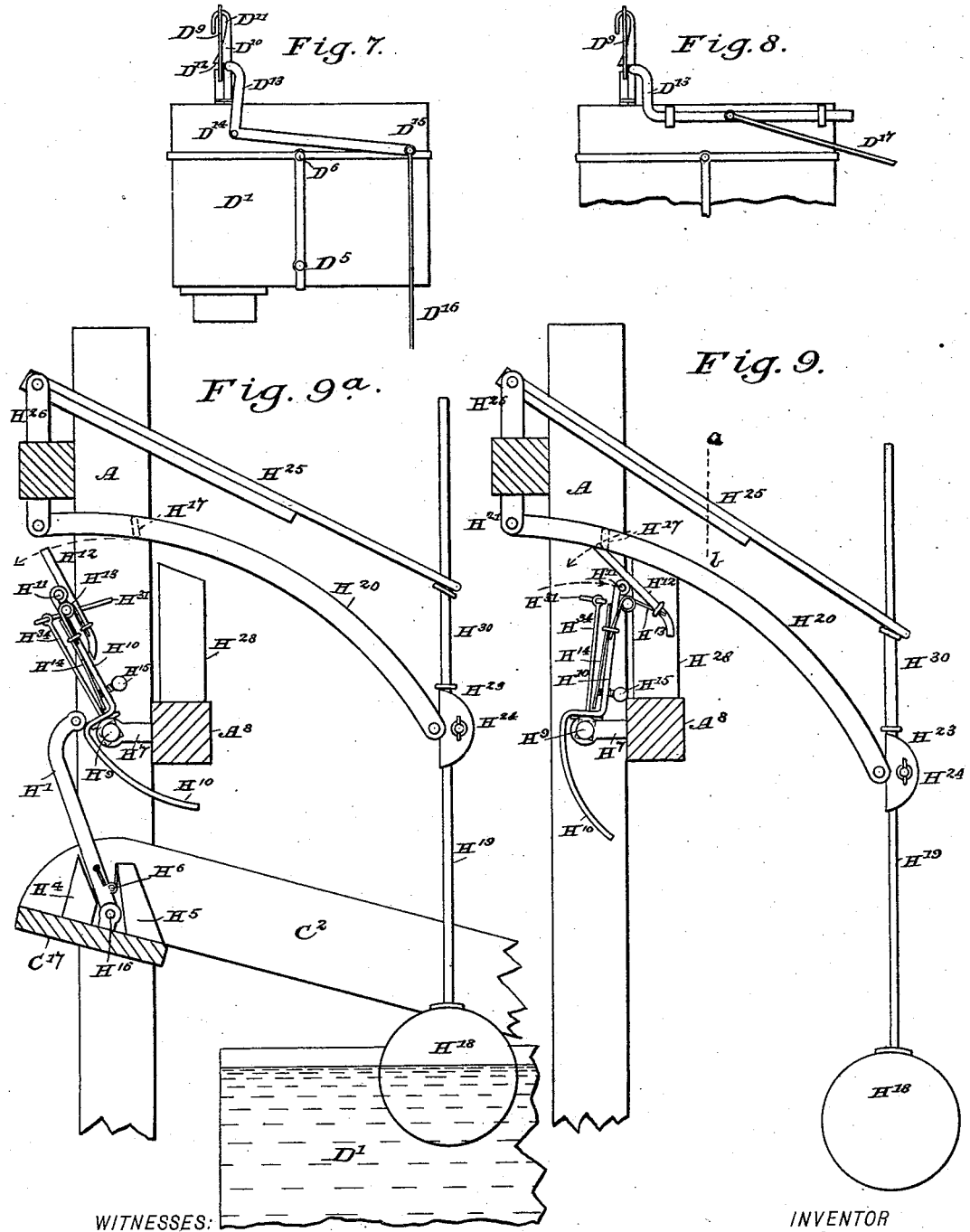

(No Model.) 4 Sheets—Sheet 4.
H. JERGER.
WATER ENGINE.
No. 477,256. Patented June 21, 1892.
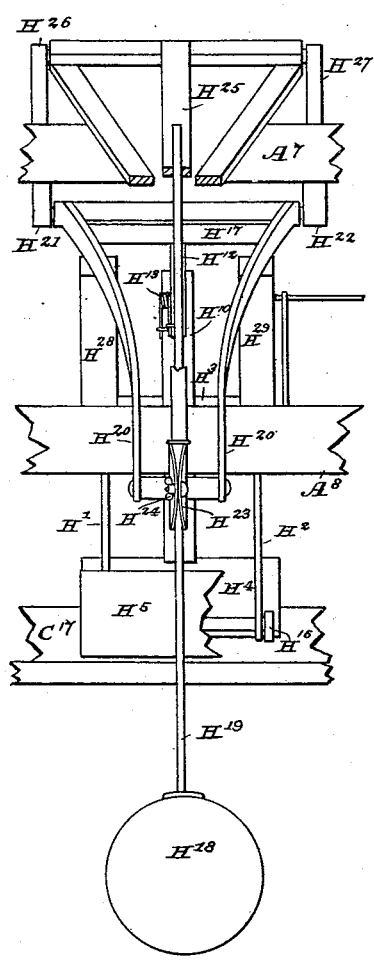
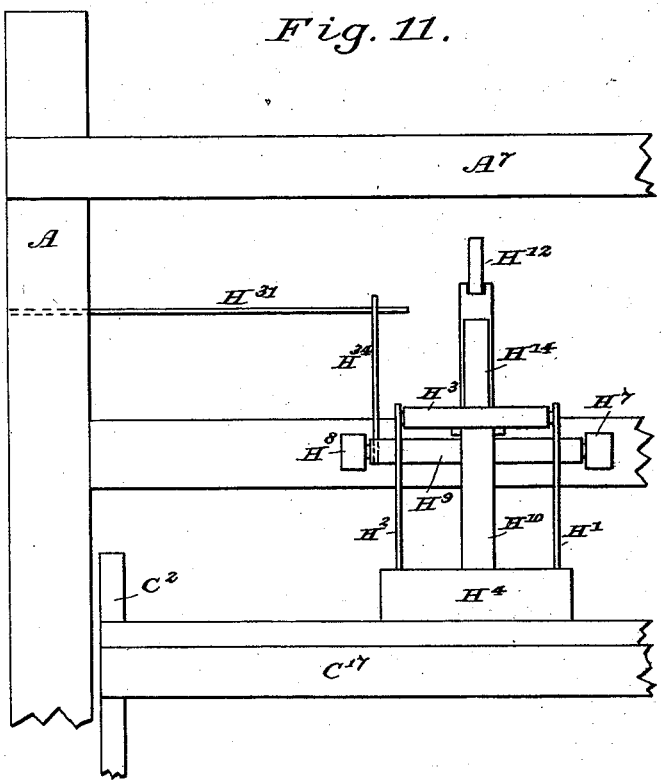
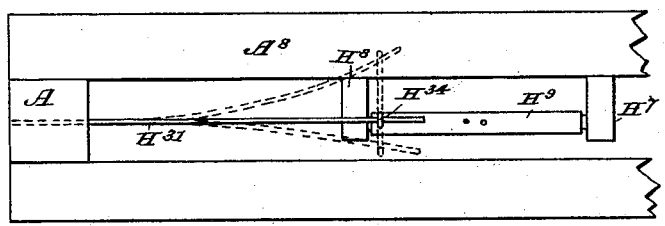
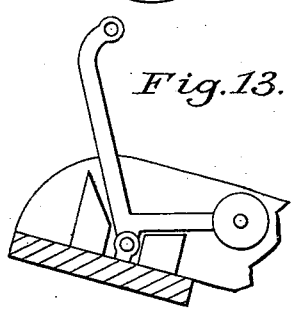
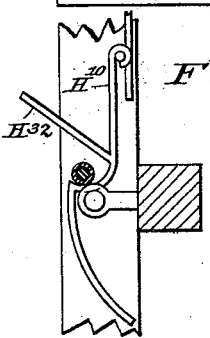
Witnesses:
E. R. Bolton
S. J. Jones
INVENTOR
Henry Jerger
BY
Richardson
ATTORNEYS

UNITED STATES PATENT OFFICE.

HENRY JERGER, OF NORWOOD, SOUTH AUSTRALIA.

WATER-ENGINE.

SPECIFICATION forming part of Letters Patent No. 477,256, dated June 21, 1892.

Application filed January 20, 1891. Serial No. 378,492. (No model.) Patented in South Australia December 4, 1890, No. 1,790.

*To all whom it may concern:*

Be it known that I, HENRY JERGER, watchmaker, a subject of the Queen of Great Britain, and a resident of Norwood, in the Province of South Australia, have invented a certain new and useful Improvement in an Improved Water-Engine, (patented in South Australia December 4, 1890, No. 1,790,) of which the following is a specification.

This invention consists of an improved engine for utilizing and applying water as a motive power.

My invention is especially useful on a river when water therefrom is required to be raised onto the bank or otherwise above the surface of the stream for irrigation or other purposes. Its use, however, is not limited to rivers, but may be adopted wherever a quantity of water is available, a portion of which is required to be raised and a fall can be obtained for the working water. It can be applied to the lifting or transferring of a large or small quantity, provided the source of supply is sufficiently in excess of the amount to be raised. Water from a stream or reservoir may be supplied through an open or closed channel or an inverted siphon, a suitable trap for stones and débris being provided.

The principle of my engine is that of an oscillating lever-beam, which is depressed at either end alternately by a weight of water applied by means of a pair of tanks or cisterns and acting on a pump rod or rods or other like mechanism arranged at any suitable distance from the fulcrum, the weight of the water and the leverage exerting a force which is very powerful, at a small cost for working.

One of the essential features of my engine consists in retaining the upper tank for the time being in its position after the water therein would naturally be sufficient to depress it and overcome the resistance of the pump or work. In this way a superadded weight is obtained, causing the lever-beam to descend with rapidity and power, and also insures the empty tank rising to its upper position. I attain the above effects by the mechanism illustrated in the accompanying drawings, in which—

Figure 1 is a side elevation with portion of the frame-work removed to show the locking apparatus. Fig. 2 is a plan of the entire engine. Fig. 3 is a section of the supply-tank on line $x\ y$ of Fig. 4. Fig. 4 is a plan of the supply-tank. Fig. 5 is an end view of one of the actuating-tanks. Fig. 6 is a plan, and Fig. 7 a side view, of the same. Fig. 8 is a side view showing alternative method of releasing spring and valve. Fig. 9 is a side view of the locking and unlocking mechanism, the parts being in the position they assume while holding the oscillating tank to receive its supply of water. Fig. $9^a$ is a view similar to that shown in Fig. 9 with the parts in position during the act of unlocking. Figs. 10 and 11 are end views of the same. Fig. $11^a$ is a detailed view showing the spring $H^{31}$ and its manner of operation. Fig. 12 shows an alternative lock. Fig. 13 shows an alternative construction of the hanger. Figs. 1 and 2 are on the scale of about half an inch to the foot. The other figures are enlarged.

Similar letters refer to similar parts throughout the several views.

I will first describe the general construction of the engine made according to my invention and as illustrated in the drawings, Figs. 1 and 2. It consists of a frame A, in the center of which are provided two fulcrum-posts, of which one is shown in elevation B', bearing the oscillating lever-beam C' C². The beam is constructed of strong timbers C' C², with cross-pieces, such as $C^4$, $C^5$, $C^{11}$, $C^{12}$, $C^{17}$, and $C^{18}$, and stay-rods $C^{10}$, and oscillates upon the axle $C^3$, journaled as shown at $B^3$, and also in a similar journal at the other side, at either end of and between the side parts C' and C² of the beam, actuating-tanks D' and D² are suspended on brackets $C^6$ $C^7$ $C^8$ $C^9$. These tanks are alternately filled or partially filled with water from the supply-tank E, and thus cause the depression of the lever-beam at either end, respectively, in the manner hereinafter explained. $D^3$ and $D^4$ are two rods which keep the two actuating-tanks upright when ascending and descending. E is a centrally-situated supply-tank. Into this the water is led through the pipe E' from whatever source supplies the motive power. $E^2$ and $E^3$ are pipes to deliver the water into the actuating-tanks D' and D², respectively, by means of suitable valves which are operated by the cross-pieces $C^4$ and $C^5$ in the beam C'. At one or both sides of the fulcrum-axle and at such distance therefrom as may be convenient are attached rods $F'$ $F^2$. These may be used to work pumps or any other device requiring intermittent motion. In the drawings I have shown the application to a pump G on one side, which is the means I have used and prefer; but it will be evident that the power may be applied in other ways, such as by a crank motion. The water to be raised is admitted from the supply-tank E through the pipe $G'$ and forced up by the pump or pumps through the pipe $G^2$ to where it is required. The supply-tank E is supported on a floor at the top of the frame-work A. The delivery-pipes $E^2$ and $E^3$ are supported at their outer ends by stays $A'$ and $A^2$. $A^3$ and $A^4$ are two buffer-pieces, which receive the ends of the beams $C'$ and $C^2$ when they come to the bottom of the stroke and avoid danger of damaging the locking-gear. $A^5$ and $A^6$ are two bars, which close the valves in the actuating-tanks. $A^7$ and $A^8$ are two cross-beams in the frame, which carry the locking mechanism.

In Figs. 3 and 4 the construction of the supply-tank and attachments are shown. E is the body of the tank, with $E'$ the supply-pipe, and $E^2$ and $E^3$ the delivery-pipes, leading into the actuating-tanks. $E^4$ and $E^5$ are the valves which control the supply of water to these. $E^{12}$ is a pipe for overflow from the tank E. $E^{13}$ and $E^{14}$ are two stays strengthening the top of the supply-tank. The cross-levers $E^6$ and $E^7$ are hinged at $E^{15}$ and $E^{16}$ and are connected to the valves $E^4$ and $E^5$ by means of connecting-rods $E^{17}$ and $E^{18}$. These cross-levers are also connected by rods $E^8$ and $E^9$ (see Fig. 1) to levers $E^{10}$ and $E^{11}$, hinged at $E^{19}$ and $E^{20}$, which are actuated by the cross-pieces $C^4$ and $C^5$ in the oscillating beam. $E^{21}$ is the opening to the pipe $C'$, which supplies the pump, and $E^{22}$ and $E^{23}$ are guides for the levers $E^6$ and $E^7$.

In Figs. 5, 6, and 7 one of the actuating-tanks is represented, the other being similar. All the tanks may be constructed of galvanized iron or of any suitable material and shape. $D^6$ and $D^6$ are two journals which rest in the brackets $C^6$ and $C^7$. $D^5$ is the stud upon which the parallel guide $D^3$ is pivoted. $D^7$ is a valve for emptying the actuating-tank. This valve is larger than the corresponding valve in the supply-tank E, thus allowing the actuating-tank to be emptied when it has descended before the raised tank at the other end of the beam is filled or released. $D^8$ is a support or bar which passes across the tank. To this is attached a specially-constructed steel spring $D^9$. $D^{10}$ is a catch which holds the spring $D^9$ either closed or open, as required. In Fig. 5 the full lines show the valve open and the dotted lines show it closed. The normal tendency of the spring is to open the valve $D^7$ by means of the connecting-rod $D^{17}$. The spring is so arranged that it presses laterally against the catch $D^{10}$, and when the tank is raised the spring comes in contact with the piece $A^5$ and is depressed from its recess $D^{11}$ in the hook $D^{10}$ and engages in the shoulder $D^{12}$, thus closing and securing the valve. When the tank has a sufficient supply of water, it is unlocked in the manner hereinafter described and descends. $D^{13}$ is a cranked bar pivoted at $D^{14}$. At the end $D^{15}$ hangs a rod $D^{16}$, which passes through a guide in the bar $D^3$. The upper end of $D^{13}$ is bent round, as shown in Fig. 7, and when the rod $D^{16}$ is raised the upper end of $D^{13}$ pushes the spring $D^9$ from the shoulder $D^{12}$, thus allowing it to spring upward and open the valve.

In Fig. 8 (an alternative method) the cranked bar $D^{13}$ slides in two guides, instead of being pivoted, and the rod $D^{17}$ is connected to the bar $D^3$ at some suitable point, so that as the tank descends the rod $D^{17}$ pushes the bar $D^{13}$ forward and releases $D^9$.

Fig. 9 is a side view of the locking and unlocking mechanism with the near side A of the frame removed.

Fig. $9^a$ is a view similar to that shown in Fig. 9 with the parts in position during the act of unlocking. Figs. 10 and 11 are end views of the same.

Fig. 12 shows an alternative lock.

Fig. 13 shows an alternative construction of the hanger.

Figs. 9, $9^a$, 10, and 11 show the mechanism for locking the tanks while filling and unlocking when sufficiently full. Fig. 11 is for the purpose of showing the portion which is hidden behind $a^8$ in Fig. 10. A represents one of the uprights of the frame, and $D'$ a portion of the tank. $D'$ is only shown in Fig. $9^a$. $A^7$ and $A^8$ are two cross-pieces of the main frame.

I will now describe the parts that are attached to the oscillating lever-beam. $C^2$ represents the end of the oscillating lever-beam, and $C^{17}$ is a cross-stay. $H'$ $H^2$ are two arms pivoted or hinged at the bottom at $H^{16}$ to the cross-piece $C^{17}$ and carrying at their top ends a round cross-piece, which is surrounded by a piece of pipe, thus forming a roller $H^3$, and the combination forming what I have termed a "hanger." The reason why a roller is used is that it gives less friction than a plain rod. $H^4$ is a block which prevents the roller $H^3$ from falling too far outward, and the block $H^5$ prevents it falling inward. It is necessary that this hanger shall be held in an approximately-perpendicular position, and for this purpose I attach either a spring, such as $H^6$, or counterpoise-weights, such as shown in Fig. 13. These are the only parts of the locking and unlocking mechanism connected to the oscillating lever-beam besides the tank. Attached to the beam $A^8$ are two bearings $H^7$ $H^8$, carrying the bar $H^9$, which is square in its center. To this bar is affixed another bar of iron, forming a hook $H^{10}$ of the shape shown. The hanger or roller $H^3$ rests upon the hook $H^{10}$, just above the bar $H^9$ and just overhanging outwardly the center of the pivots. The weight of the tank while the tank is filling is taken by the bar $H^9$ and its bearings, and the weight tends to pull the hook $H^{10}$ round on its pivot in the direction shown by the arrow, which would free the roller $H^3$ and allow the tank to fall. In the meanwhile the hook $H^{10}$ is kept in position or prevented from turning by the catch-piece $H^{12}$, which is pivoted at $H^{11}$, and by the cross-piece or stop $H^{17}$.

The cross-piece $H^{17}$ is operated as follows: $H^{18}$ is a ball-float having a long shaft $H^{19}$ attached to its upper part. $H^{20}$ is a frame, which is pivoted at $H^{21}$ and $H^{22}$ to the bar $A^7$. At the lower end of $H^{20}$ is a casing $H^{23}$, which fits around the shaft $H^{19}$ and is caused to grip the same by a screw $H^{24}$. As it may sometimes be desirable to work without filling the actuating-tanks, the ball may be set at any desired height by loosening the screw $H^{24}$ and sliding the shaft $H^{19}$ up or down the casing $H^{23}$ to the position required, when $H^{24}$ is again tightened and secured. $H^{25}$ is a frame-work pivoted at $H^{26}$ and $H^{27}$, having in its free end a hole through which the shaft $H^{19}$ passes and whose purpose is to keep the shaft $H^{19}$ upright. In Fig. 10 this piece is shown cut off at line $a\,b$, Fig. 9. $H^{17}$ is a cross-piece forming a portion of the frame $H^{20}$. $H^{28}$ and $H^{29}$ are two stops which support the frame-work $H^{20}$ and the ball when the actuating-tank has fallen. $H^{30}$ is a tube which keeps $H^{20}$ and $H^{25}$ the right distance apart.

The catch-piece $H^{12}$ is connected to $H^{10}$ and operated as follows: The upper end of the hook-piece $H^{10}$ is provided with an eye $H^{11}$, in which is pivoted the catch-piece $H^{12}$. While the tank is filling the bottom end of the catch-piece $H^{12}$ is pressed against $H^{10}$, and $H^{12}$ practically forms a rigid part of $H^{10}$ so long as the pressure is in the direction indicated by the arrow—that is to say, while the tank is filling. In order to cause the catch-piece $H^{12}$ to be returned after action to its normal position, a spring $H^{13}$ is attached to its lower end. After the actuating-tank has been released from hook $H^{10}$ (the means by which this is done is shown later) and the frame $H^{20}$, carrying the top $H^{17}$, has fallen to its position on the blocks $H^{28}\,H^{29}$ the hook $H^{10}$ is returned to its normal position, as shown in the drawings, by means of the spring $H^{31}$, one end of which is fixed to one of the uprights A and the other end fastened in $H^9$. During its return the catch-piece $H^{12}$ has to pass to the back of the stop $H^{17}$. This is done by the catch-piece $H^{12}$ turning upon its hinge $H^{11}$, the lower end moving out from $H^{10}$ and the upper end turning downward, passing under $H^{17}$, and by means of the spring $H^{13}$ it is returned to its upright position. To the outside of $H^{10}$ a spring-piece $H^{14}$ is riveted at the top end. The bottom end tends to close against $H^{10}$, but may be thrust outward and regulated by means of the screw $H^{15}$. The purpose of the screw $H^{15}$ is to enable the plate $H^{14}$ to be set so that the center of the roller $H^3$ is a little outside the line of the centers of the pivots $H^9$ and $H^{16}$, as shown. The bottom part of $H^{10}$ is shaped as shown in order to insure the roller $H^3$ passing outward and lodging in its right position. The action of these parts is as follows: When the tank has a sufficient amount of water in it, the ball $H^{18}$ rises, lifting the frame $H^{20}$ and carrying with it the cross-piece or stop $H^{17}$, thus freeing the top end of the piece $H^{12}$, which allows the hook-piece $H^{10}$ to rotate in the direction of the arrow, and consequently releases the hanger, composed of the roller $H^3$ and arms $H'\,H^2$, and allows the actuating-tank to fall. As the tank $D'$ falls away the ball $H^{18}$ and frame $H^{20}$ and their connections also fall on the blocks $H^{28}\,H^{29}$. The spring $H^{31}$ then causes the bar $H^9$, to which is rigidly attached the hook-piece $H^{10}$ to be returned to its normal position when the weight of the tank has been removed. The piece $H^{12}$, turning upon the pivot $H^{11}$, passes under the stop $H^{17}$, and the spring $H^{13}$ then draws it back into its normal position.

Fig. 12 shows a different construction of the piece $H^{10}$. It has a bar $H^{32}$ instead of the spring $H^{31}$. As the roller $H^3$ rises it strikes against $H^{32}$ and lifts it up, so as to cause the catch-piece $H^{12}$ to pass under the stop $H^{17}$.

The method of operation is as follows: The supply-water from the stream-reservoir or other source is led into the supply-tank E, and thence through whichever one of the delivery-pipes may be open into one of the actuating-tanks. These tanks may be set to fall when full or when they contain sufficient water to perform the work required. As soon as one of the upper tanks $D'$ has received sufficient water the ball $H^{18}$ rises, lifting with it the stop $H^{17}$, allowing the piece $H^{10}$ to rotate on its axis, thus freeing the roller $H^3$, allowing the tank to descend, and actuating the pump-rods or other mechanism. As the tank $D'$ descends the hinged lever $E^{10}$, which rests upon the cross-piece $C^4$, falls with it and allows the valve $E^4$ to close, thus preventing any more water flowing out. When the actuating-tank $D'$ reaches within a short distance of the floor, the bottom end of the rod $D^{16}$ strikes a stop, moving the lever $D^{13}$ on the pivot $D^{14}$, and pushes the spring-rod $D^9$ out of the shoulder $D^{12}$, thus opening the valve $D^7$. The tank $D'$ is thereupon emptied, the time of emptying being so arranged by the size of the valve that it is completed before the other actuating-tank $D^2$ has been filled. As the other end of the beam, with the tank $D^2$, rises the cross-piece $C^5$, strikes the hinged piece $E^{11}$, and carries it upward, and by means of connecting-rods $E^9$, lever $E^7$, and connecting-rod $E^{18}$, opens the valve $E^5$ and allows the water to flow through delivery-pipe $E^3$ into the tank $D^2$ until there is sufficient water to lift the float when the same process, as before described, is repeated. The valve $D^7$ in the tank $D^2$ is closed in the following manner: When the beam has nearly reached the top of its stroke, the upper end of the spring $D^9$ strikes against the stop $A^6$ and, as the tank continues to ascend, is forced downward until it springs into the shoulder $D^{12}$, thus closing the valve $D^7$. Either one or two pumps and either suction or force pump may be used. The water is delivered by the discharge-pipe $G^2$ at such height or position as may be determined, having due regard to the quantity required and the power of the machinery. An important feature of this engine is the continuity of operation without manipulation. Whether the inflow of motive-water is large or small the actuating-tank will descend when the water reaches the valve-ball and not before.

I do not bind myself to the details of construction herein set forth. The engines may be made of any size and of suitable material. The locking and unlocking of the tanks may be varied. I have shown several methods. Others may be applied without departing from my invention. I prefer the one shown in the main drawings. I have omitted some of the stay-pieces of the frame-work for the purpose of clearly indicating the other mechanism.

I am aware that a lever-beam has been used, having a fixed tank at each end, with water continuously running from a fixed central supply-pipe to one or the other tank alternately, as the same was raised or depressed, without locking and unlocking apparatus.

What I claim as my invention, and desire to secure by Letters Patent, is—

1. In a water-engine, the combination, with an oscillating lever-beam, of actuating-tanks, one pivoted to each end of said beam, rods for keeping said tanks upright while ascending and descending, and means for locking and unlocking said tanks, and a hanger for retaining them in their upper position, substantially as and for the purpose specified.

2. In a water-engine, the combination, with an oscillating lever-beam, of actuating-tanks pivotally connected, one at each end of said beam, means for locking and unlocking said tanks, a hanger for retaining the actuating-tanks in upper position, rods pivotally attached to said tanks for keeping them upright during their up and down movements, and a ball-float adapted to release the tanks, substantially as set forth.

3. The combination of lever-beam $C' C^2$, supply-tank E, the pump-rods $F' F^2$, the actuating-tanks $D' D^2$, pivotally connected to said beam, the rods $D^3 D^4$ for keeping the tanks in their upright position as they ascend and descend, and the locking apparatus, substantially as and for the purposes described.

In testimony that I claim the foregoing as my invention I have signed my name, in presence of two witnesses, this 2d day of December, 1890.

HENRY JERGER.

Witnesses:
CHARLES N. COLLISON,
    *Patent Agent, Adelaide.*
GEO. E. PASCOE,
*Clerk to Collison & Co., Patent Agents, Adelaide.*